(12) United States Patent
Oliphant

(10) Patent No.: US 9,296,327 B2
(45) Date of Patent: Mar. 29, 2016

(54) TRAILER APPARATUS FOR TRANSPORTING UTILITY POLES AND METHODS FOR SAME

(75) Inventor: Wesley J. Oliphant, Tomball, TX (US)

(73) Assignee: Trinity Industries, Inc., Dallas, TX (US)

( * ) Notice: Subject to any disclaimer, the term of this patent is extended or adjusted under 35 U.S.C. 154(b) by 108 days.

(21) Appl. No.: 13/023,982

(22) Filed: Feb. 9, 2011

(65) Prior Publication Data

US 2012/0200063 A1    Aug. 9, 2012

(51) Int. Cl.
*B62D 53/00* (2006.01)
*B60P 3/40* (2006.01)
*B62D 21/20* (2006.01)

(52) U.S. Cl.
CPC .. *B60P 3/40* (2013.01); *B62D 21/20* (2013.01)

(58) Field of Classification Search
CPC .................................. B60P 3/40; B62D 21/20
USPC .......... 280/81.1, 81.6, 404, 408; 414/23, 460, 414/537, 538; 254/324, 325
See application file for complete search history.

(56) References Cited

U.S. PATENT DOCUMENTS

| | | | | |
|---|---|---|---|---|
| 2,470,242 A | * | 5/1949 | Felsing | 254/323 |
| 2,540,803 A | * | 2/1951 | Alexander et al. | 414/460 |
| 5,127,663 A | * | 7/1992 | Whitehead | 280/404 |
| 5,862,926 A | * | 1/1999 | Johnson | 212/180 |

* cited by examiner

*Primary Examiner* — Joseph Rocca
*Assistant Examiner* — Jacob Knutson
(74) *Attorney, Agent, or Firm* — Michael G. Smith, Esq.

(57) ABSTRACT

Embodiments provide trailer apparatus, and methods such trailer apparatus, for transporting an elongated utility pole from a loading location to an unloading location, the trailer apparatus including a major frame assembly, a carrying bay, at least one wheel for supporting the trailer apparatus for rolling movement, and lifting apparatus supported by the major frame assembly, the lifting apparatus being selectively operable for lifting the utility pole between a ground storage position and a transport position, and for lowering the same.

11 Claims, 11 Drawing Sheets

TRAILER APPARATUS FOR TRANSPORTING UTILITY POLES AND METHODS FOR SAME

FIELD OF INVENTION

The disclosure relates to trailers and methods for transporting utility poles.

BACKGROUND OF INVENTION

Elevated utility lines include, for example, elevated electric utility transmission lines. Elevated utility lines extend along a route and include one or more continuous utility cables extending along the route to carry utility service. The utility cables are supported above ground at designated heights that provide clearance over terrain features and obstacles such as structures along the route. Elevated utility lines include a plurality of supports, such as elongated utility poles, spaced along the route to support the utility cables at necessary heights. The utility poles are spaced apart, and the utility cables span from pole to pole.

During construction of a utility line along a route, the utility poles are fabricated at suitable fabrication facilities and transported from the fabrication facilities to pole installation locations along the route. A utility pole can be transported from a fabrication facility to a pole installation location on a flatbed trailer drawn by a truck.

For reasons stated below, and for other reasons which will become apparent to those skilled in the art upon reading the present specification, there is a need in the art for improved trailer apparatus for transporting utility poles, and for improved methods for transporting utility poles.

BRIEF DESCRIPTION OF INVENTION

Embodiments provide improved trailer apparatus for transporting utility poles. Embodiments provide improved methods for transporting utility poles. Various shortcomings, disadvantages and problems of trailers and methods for transporting utility poles are addressed herein, which will be understood by reading and studying the following specification.

DETAILED DESCRIPTION OF EMBODIMENTS

In the following detailed description of embodiments, reference is made to the accompanying drawings that form a part hereof, and in which is shown by way of illustration specific embodiments which can be practiced. Embodiments are described in sufficient detail to enable those skilled in the art to practice the embodiments, and it will be understood by one of ordinary skill that other embodiments can be utilized and that logical, mechanical and other changes can be made without departing from the scope of the embodiments. The following detailed description is, therefore, not to be taken in a limiting sense and shall not limit the scope of the claims.

Figure 1:
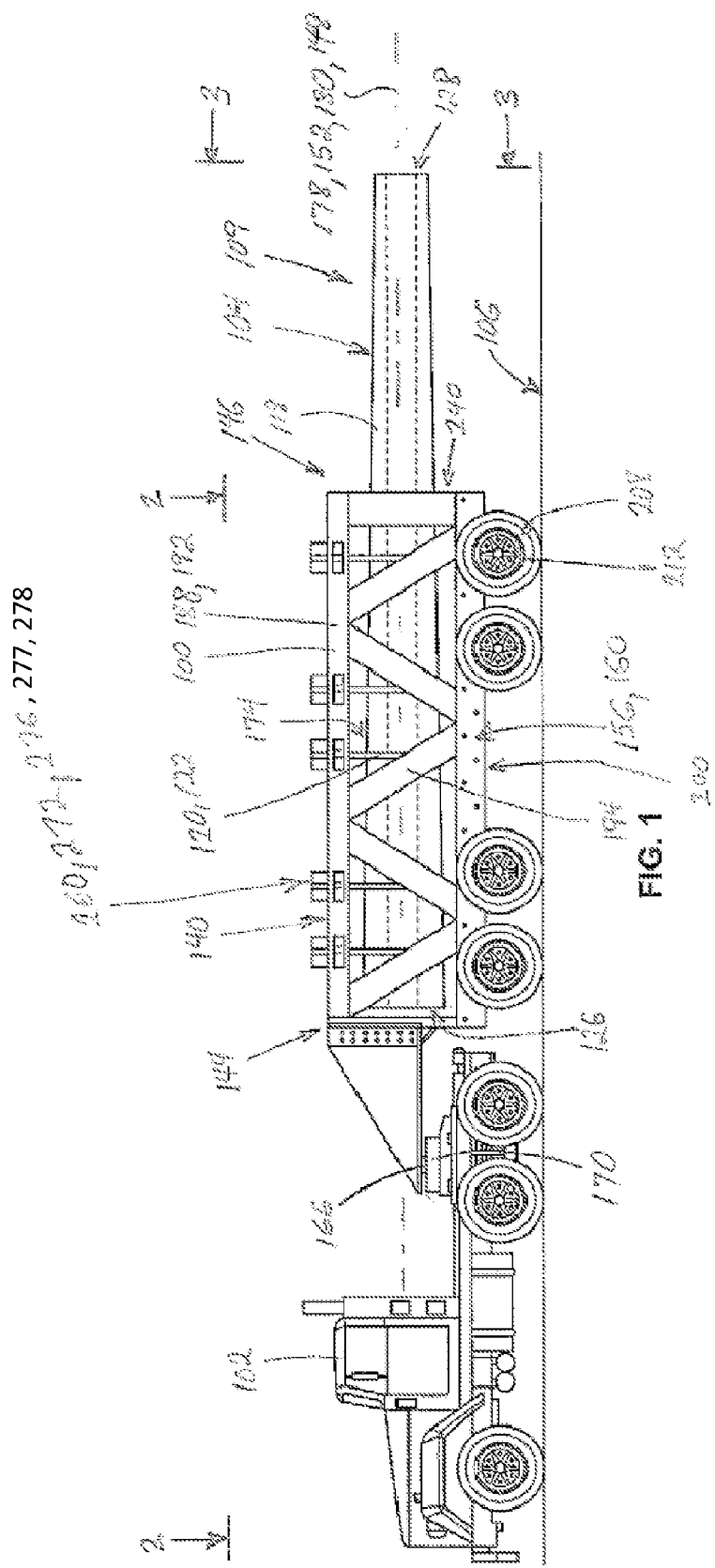
FIG. 1 is a side elevation view of trailer apparatus according to an embodiment in combination with a truck and carrying a utility pole.

FIG. 1 is a side elevation view of trailer apparatus 100 according to an embodiment, shown in combination with a truck 102 and carrying a utility pole 104. One skilled in the art will appreciate that trailer apparatus 100 can be configured differently without departing from the scope of the present disclosure and embodiments. One of ordinary skill will understand, for example, that trailer apparatus 100 can be configured with truck 102 integrally connected therewith in a unitary configuration. One skilled in the art will understand that trailer apparatus 100 is a specific embodiment of subject matter more broadly disclosed herein, and is described in this written description and illustrated in the drawings in order to satisfy statutory requirements, and is not to be interpreted as limiting the scope of any claim.

Figure 6:
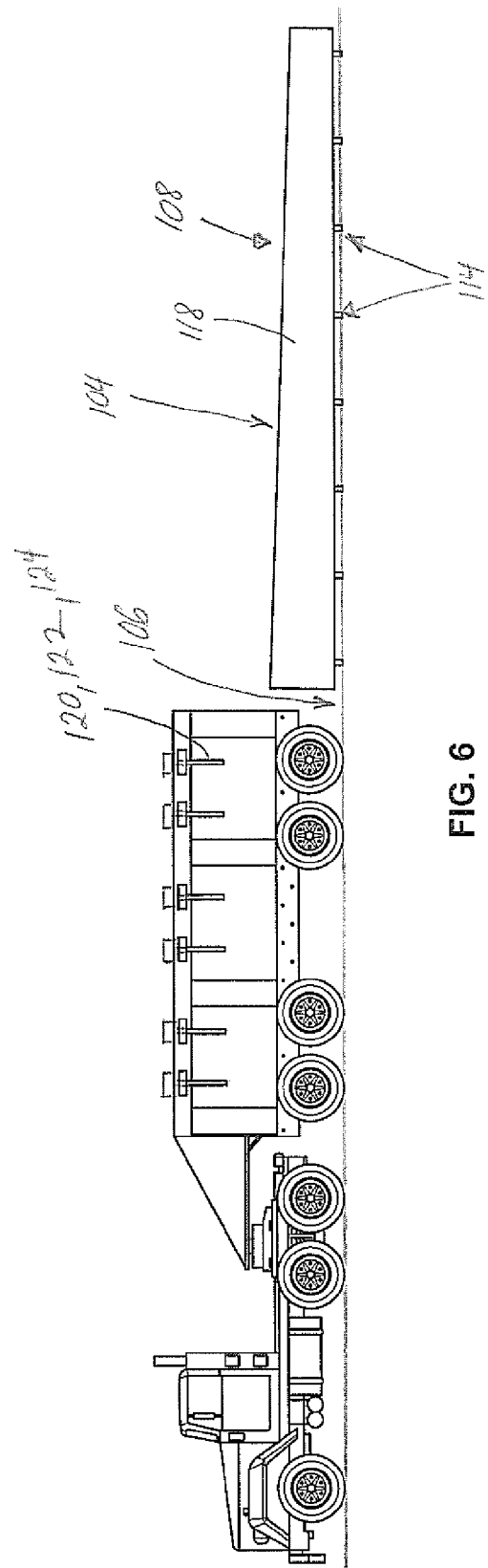
FIG. 6 is a schematic side view of trailer apparatus according to an embodiment aligned to be backed over a utility pole resting in a ground storage position and taken along 6-6 in FIG. 5.
Figure 7:
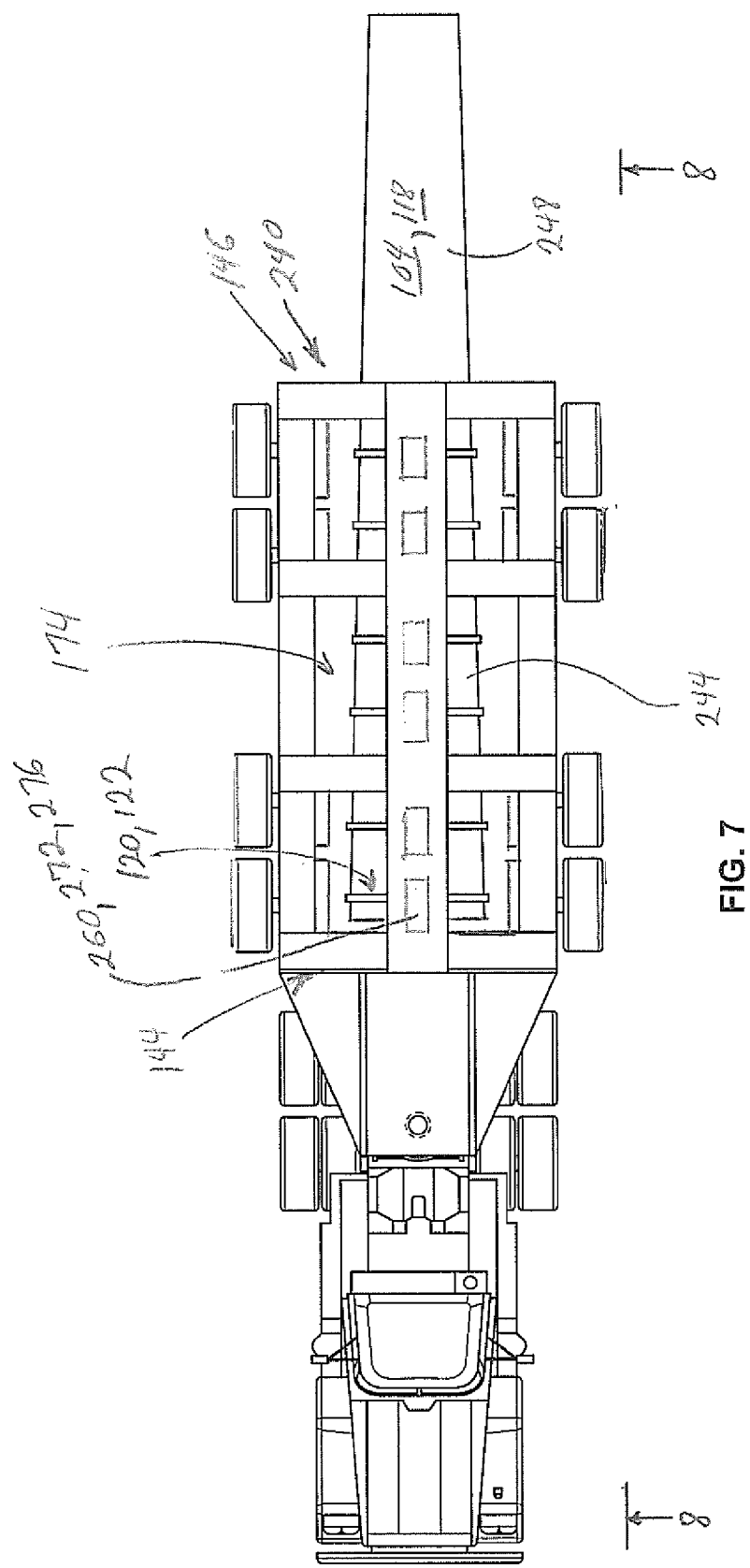
FIG. 7 is a schematic top view of trailer apparatus according to an embodiment generally shown in FIG. 5, with the trailer apparatus positioned over a utility pole resting in a ground storage position with a segment of the utility pole aligned below the carrier bay and having hoist slings extending around the same for lifting the utility pole.

Trailer apparatus 100 is configured for transporting an elongated utility pole 104 across land from a first or loading location to a second or unloading location. The loading location can be, for example, a fabrication facility where the utility pole 104 is fabricated. The unloading location can be, for example, a remote pole installation location along a route of a utility line under construction. It will be understood by those of ordinary skill that use of the trailer apparatus 100 to transport a utility pole 104 from a first location to a second location allows the utility pole 104 to be loaded at the first location from a substantially horizontal ground storage position 108 (shown in FIG. 6) to a transport position 109 (shown in FIG. 1) on the trailer apparatus 100 solely by operation of the truck 102 and trailer apparatus 100 in combination at the first location. It will be understood by those of ordinary skill that, in this aspect, trailer apparatus 100 is "self-loading". As used herein, "self-loading" is defined by the applicant, acting as lexicographer, to mean that a utility pole 104 resting on ground 106 in a substantially horizontal ground storage position 108 (shown in FIG. 6) can be lifted or raised to a transport position 109 on trailer apparatus 100, according to embodiments, solely by operation of the truck 102 and trailer apparatus 100 in combination, and without use of a separate lifting equipment unit, such as a crane or forklift (not shown), to perform at least part of the task of loading the utility pole 104 on trailer apparatus 100 at the first location. It will be understood by those of ordinary skill that, as used herein, "ground storage position" 108 (shown in FIG. 6) of the utility pole 104 refers to a position wherein the utility pole 104 rests on its side and is supported relative to the ground 106 upon a spaced set of minor ground supports 114, spacers, braces, or runners such as, for example, a spaced set of 4" by 4" by 48" or similar cross member supports, or upon a spaced set of rail cross ties, the spaced set of ground supports 114 being interposed between the ground 106 and the portion of the outer surface 118 of the utility pole 104 nearest the ground 106, and thus at least minimal clearance being provided between the same for lifting engagement apparatus 120 such as a spaced set of hoist cables 122 or compatible hoist rigging 124 to be routed between the utility pole 104 and the ground 106 at respective locations spaced along the length of the utility pole 104 for engaging the outer surface 118. One of ordinary skill will appreciate that a utility pole 104 which, in fact, rests with a portion of the outer surface 118 thereof in direct contact with the ground 106 along the length of the utility pole 104 described by and falls within the definition of ground storage position 108 as set forth in the preceding sentence and as used in this disclosure, inasmuch that one can with avoidable difficulty dig out, bore, chisel or similarly fashion small clearance passages in the ground 106 beneath the outer surface 118 of a utility pole 104 resting directly on the ground 106 to provide clearance for passing the lifting engagement apparatus 120, hoist cables 122 or compatible hoist rigging 124 beneath the outer surface 118 of the resting utility pole 104 for the purpose of engaging the utility pole 104 in lifting relationship with the respective lifting engagement apparatus 120, hoist cables 122 or compatible hoist rigging 124, as may be present on the trailer apparatus 100.

It will be understood by those of ordinary skill that use of the trailer apparatus 100 to transport a utility pole 104 from a first location to a second location allows the utility pole 104 to be unloaded at the remote second location from a transport position 109 on the trailer apparatus 100 to a ground storage position 108 (see FIG. 6) solely by operation of the truck 102 and trailer apparatus 100 in combination at the second location. It will be understood by those of ordinary skill that, in this aspect, trailer apparatus 100 is "self-unloading". As used herein, "self-unloading" is defined by the applicant, acting as lexicographer, to mean that a utility pole 104 supported in a transport position 109 on trailer apparatus 100 according to embodiments can be lowered to a ground storage position 108 (see FIG. 6) on ground 106, and left in the ground storage position 108 at the second location upon departure therefrom of the truck 102 and trailer apparatus 100, solely by operation of the truck 102 and trailer apparatus 100 in combination, and without use of a separate lifting equipment unit, such as a crane or forklift (not shown), to perform at least part of the task of unloading the utility pole 104 from trailer apparatus 100 at the second location. It will be understood by those of ordinary skill that, as used herein, ground storage position 108 has the meaning described in the preceding paragraph of this disclosure.

Figure 3:
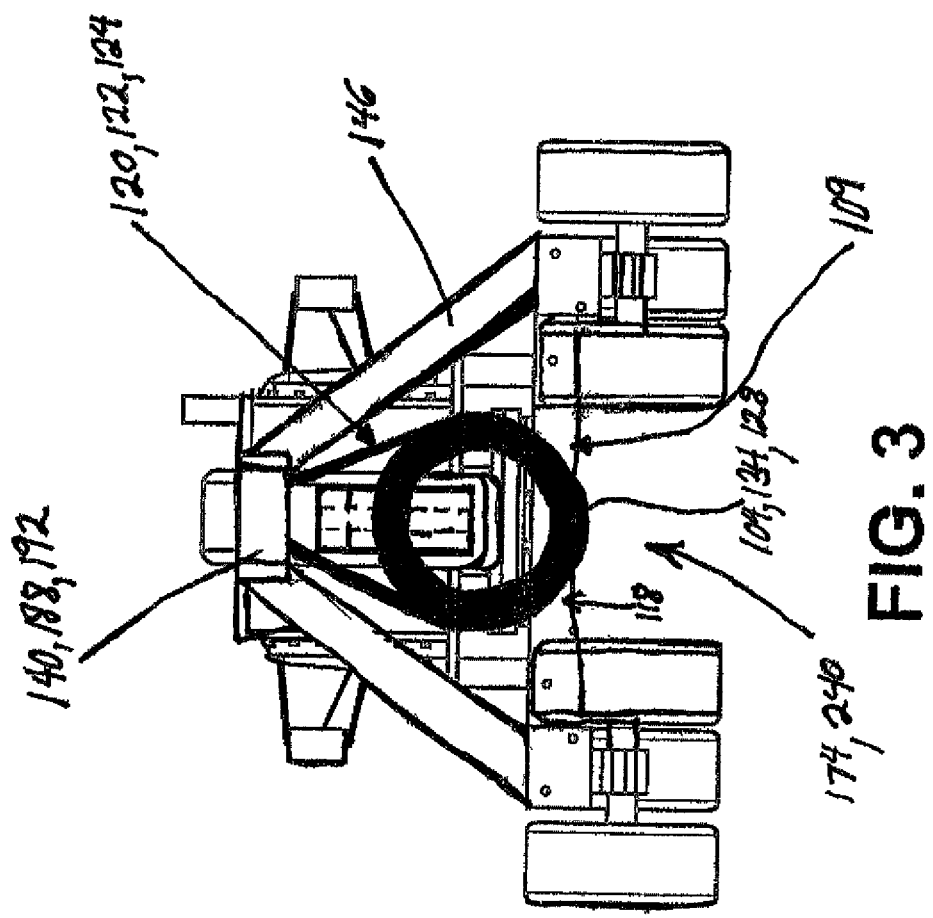
FIG. 3 is a rear elevation view of trailer apparatus according to an embodiment and taken generally along 3-3 in FIG. 1.

Referring to FIG. 1, one of ordinary skill will understand that utility pole 104 has a substantially rigid, continuous outer surface 118 extending from a first end 126 to an oppositely disposed second end 128 spaced therefrom. Outer surface 118 extends in substantially parallel spaced relation to a pole central axis 130. One of ordinary skill will understand that outer surface 118 can taper from end to end, and can taper at different rates along the length of utility pole 104, and thus the indicated "substantially parallel" relationship of the outer surface 118 and pole central axis 130 is imprecise. Utility pole 104 can be of any desired cross sectional size, length and weight. According to a specific embodiment shown in FIG. 1, utility pole 104 is a prestressed, reinforced spincast or spun concrete utility pole having a continuous outer wall 134 (shown in FIG. 3). As shown in FIG. 3, in the specific embodiment illustrated, outer wall 134 can have a wall thickness of several inches and an overall width or nominal outside diameter that tapers from first end 126 to second end 128. One of ordinary skill will understand that the term diameter or nominal outside diameter is often used in the art to describe utility poles 104 having polygonal cross-sectional shapes and thus is imprecise, and that it is knowledge common to those of ordinary skill that utility poles 104, rather than having a circular cross-sectional shape, can have a regular polygonal cross sectional shape, such as dodecahedronal (twelve sided), for example. In the specific embodiment illustrated in FIG. 1, utility pole 104 at first end 126 has a diameter in the range of about 30 inches to about 60 inches, and at second end 128 has a diameter in the range of about 15 inches to about 30 inches. Although utility poles can differ in length, in the specific embodiment illustrated in FIG. 1, utility pole 104 has a total length in the range of about 80 feet to about 160 feet. Although utility poles can be of different weights, in the specific embodiment illustrated in FIG. 1, utility pole 104 has a total weight in the range of about 20,000 tons to about 60,000 tons. It will be understood that utility poles 104 to be transported can have different characteristics than the ranges and materials described here. For example, utility poles 104 can be formed of steel or other structural material, or a combination of steel and concrete, rather than reinforced concrete.

Figure 2:
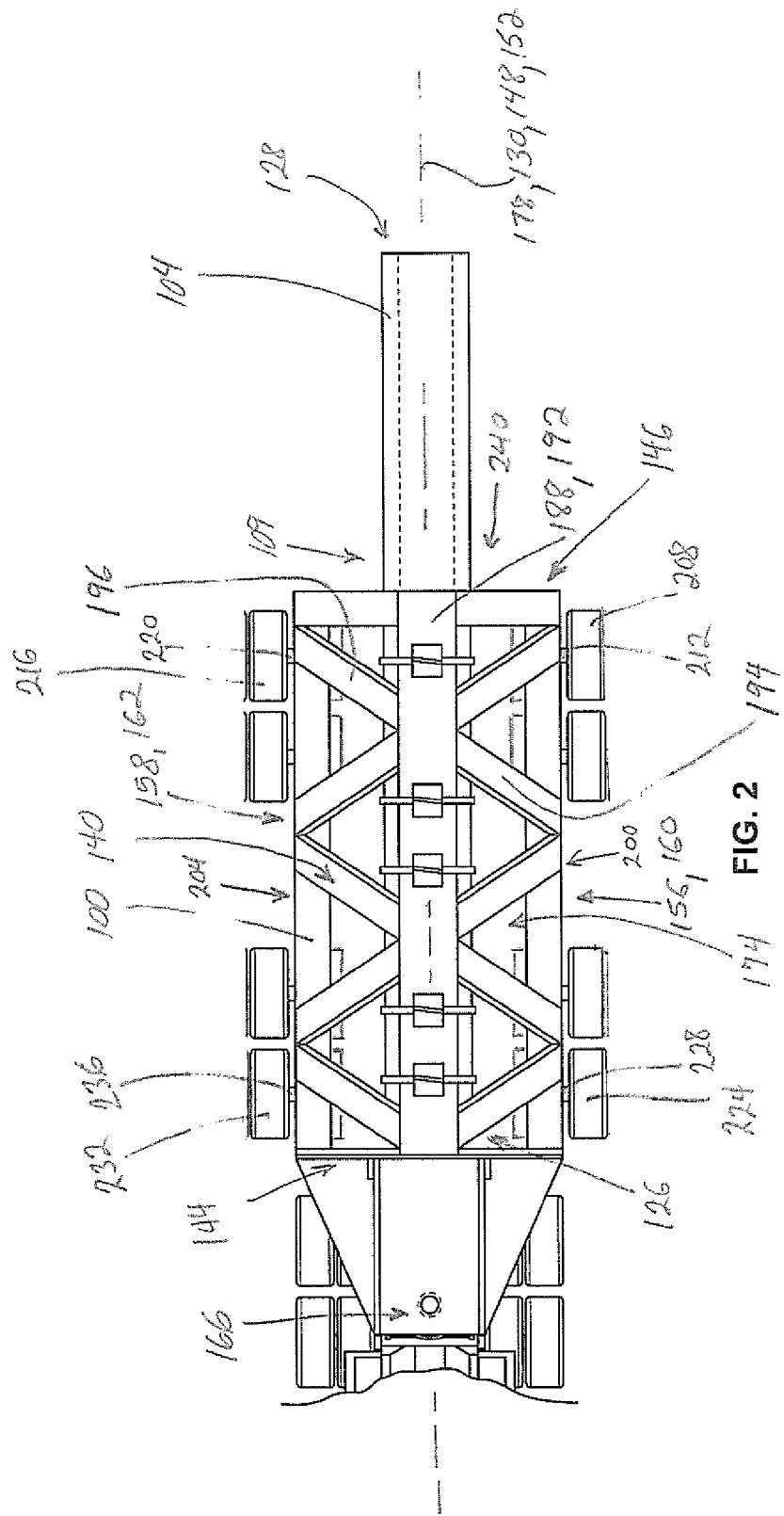
FIG. 2 is an enlarged partial top view of trailer apparatus according to an embodiment and taken generally along 2-2 in FIG. 1.

Referring again to FIG. 1, trailer apparatus 100 includes a major frame assembly 140. Major frame assembly 140 has a front 144 and rear 146. Rear 146 is spaced from front 144 and disposed in opposed relation to front 144. Rear 146 is spaced from front 144 in a rearward direction relative to a trailer frame longitudinal axis 148. Major frame assembly 140 extends between the front 144 and rear 146 relative to the trailer frame longitudinal axis 148. Referring to FIG. 2, trailer frame longitudinal axis 148 defines longitudinal extent of a trailer frame longitudinal plane 152 extending in a vertical direction therethrough. Trailer frame longitudinal plane 152 substantially bisects the major frame assembly 140 intermediate oppositely disposed lateral first and second halves 156, 158 thereof. The first half 156 is defined on a first side 160 of trailer frame longitudinal plane 152 in lateral relation thereto. Second half 158 is defined on a second side 162 of the trailer frame longitudinal plane 152 in lateral relation thereto and in opposed relationship to first half 156.

Referring to FIG. 1, trailer apparatus 100 includes a forward trailer hitch component 166 joined in fixed relation to the major frame assembly 140 proximate the front 144. The forward trailer hitch component 166 is configured for coupling with a compatible drawing hitch component 170 of the truck 102 to enable the trailer apparatus 100 to be drawn by the truck 102. Any suitable trailer hitch component 166 can be used. In the specific embodiment illustrated in FIG. 1, the truck 102 includes a drawing hitch component 170 that is commonly called a fifth wheel. In the specific embodiment illustrated in FIG. 1, trailer apparatus 100 includes a compatible drawing hitch component 170 that is a hitch pin compatible with the fifth wheel for coupling therewith.

Referring to FIG. 1, the major frame assembly 140 is open and defines an elongated carrying bay 174. Carrying bay 174 has a carrying bay longitudinal plane 178. In the specific embodiment illustrated, carrying bay longitudinal plane 178 extends in a vertical direction and is coextensive with the trailer frame longitudinal plane 152. Referring to FIG. 2, carrying bay 174 has a clear span width in a plane or direction extending perpendicular to the carrying bay longitudinal plane 178. The clear span width is sufficient to permit the utility pole 104 to be received in the carrying bay 174 in the transport position 109. In the transport position 109 the pole central axis 130 extends in a substantially horizontal orientation in alignment with the carrying bay longitudinal plane 178. The carrying bay 174 has a clear span height in the vertical direction. It will be understood that the clear span height is sufficient to permit the utility pole 104 to be received in the carrying bay 174 in the transport position 109 with clearance between the utility pole 104 and the ground 106 adequate to permit transport of the utility pole 104 across land on the trailer apparatus 100. It will be understood that trailer 100 in carrying bay 174 lacks any member that would obstruct the utility pole 104 from being self-loaded from a ground storage position 108 to transport position 109 in carrying bay 174 or from being self-unloaded from transport position 109 to ground storage position 108.

Referring to FIG. 1, the major frame assembly 140 has an upper portion 188 spanning above the carrying bay 174 from the first half 156 to the second half 158. Carrying bay 174 is provided under upper portion 188. Referring to FIG. 3, it will be observed that, in the specific embodiment illustrated, clear span height measured immediately below upper portion 188. In the specific embodiment shown in FIG. 1, upper portion 188 is defined by a primary structural beam 192 extending in a substantially horizontal orientation along trailer frame longitudinal plane 152 supported above carrying bay 174 in elevated relation to the ground 106.

Referring to FIG. 1, the major frame assembly 140 in the first half 156 has a first side portion 194. The first side portion 194 extends downwardly from the upper portion 188 defined by primary structural beam 192 to support the same in elevated relation to the ground 106. The first side portion 194 terminates below the upper portion 188 in spaced relation thereto at a respective first lower portion 200. In the specific embodiment illustrated in FIG. 1, and as best seen in FIG. 2, first lower portion 200 is spaced outwardly from upper portion 188 in the direction perpendicular to the trailer frame longitudinal plane 152 on the first side 160. Referring to FIG. 2, the major frame assembly 140 in the second half 158 has a second side portion 196. The second side portion 196 extends downwardly from the upper portion 188 defined by primary structural beam 192 to support the same in elevated relation to the ground 106. The second side portion 196 terminates below the upper portion 188 in spaced relation thereto at a respective second lower portion 204. In the specific embodiment illustrated in FIG. 1, and as best seen in FIG. 2, second lower portion 204 is spaced outwardly from upper portion 188 in the direction perpendicular to the trailer frame longitudinal plane 152 on the second side 162. The upper portion 188, i.e. primary structural beam 192, spans from the first side portion 194 to the second side portion 196 to join the same in fixed relation, and thus joins the first and second halves 156, 158 in fixed relation. Referring to FIG. 3, the first side portion 194 is spaced from the second side portion 196 with the carrying bay 174 disposed there between to provide the clear span width there between. The first side portion 194 extends upward from the first lower portion 200 to the upper portion 188 to support the upper portion 188 in the first half 156 at the clear span height. The second side portion 196 extends upward from the second lower portion 204 to the upper portion 188 to support the upper portion 188 in the second half 158 at the clear span height.

Referring again to FIG. 1, trailer apparatus 100 on first half 156 includes at least one first rear trailer wheel 208 mounted on a respective first rear axle 212 at the first lower portion 200 to support the trailer apparatus 100 for rolling movement across the ground 106. Referring to FIG. 2, it will be understood that the first rear axle 212 having at least one first rear trailer wheel 208 mounted thereon is located clear of the carrying bay 174 and is spaced outwardly from the same on the first side 160. In the specific embodiment illustrated in FIG. 1, trailer apparatus 100 on first half 156 includes two adjacent pairs of first rear trailer wheels 208 each mounted on a respective one of a pair of adjacent, parallel first rear axles 212 at the first lower portion 200 to support the trailer apparatus 100 for rolling movement across the ground 106. In other words, in the specific embodiment illustrated in FIG. 1, trailer apparatus 100 includes a total of four first rear trailer wheels 208 mounted in pairs near the rear 146 on respective of two spaced first rear axles 212 at the first lower portion 200 of the first side portion 194.

Referring again to FIG. 2, trailer apparatus 100 on second half 158 includes at least one second rear trailer wheel 216 mounted on a respective first rear axle 220 at the second lower portion 204 to support the trailer apparatus 100 for rolling movement across the ground 106. Referring to FIG. 2, it will be understood that the second rear axle 220 having at least one second rear trailer wheel 216 mounted thereon is located clear of the carrying bay 174 and is spaced outwardly from the same on the second side 162. In the specific embodiment illustrated in FIG. 1, trailer apparatus 100 on second half 158 includes two adjacent pairs of second rear trailer wheels 216 each mounted on a respective one of a pair of adjacent second rear axles 220 at the second lower portion 204 to support the trailer apparatus 100 for rolling movement across the ground 106. In other words, in the specific embodiment illustrated in FIG. 1, trailer apparatus 100 includes a total of four second rear trailer wheels 216 mounted in pairs near the rear 146 on respective of two spaced second rear axles 220 at the second lower portion 204 of the second side portion 196.

Referring again to FIG. 1, in the specific embodiment illustrated, trailer apparatus 100 on first half 156 includes at least one first forward trailer wheel 224 mounted on a respective first forward axle 228 at the first lower portion 200, and which is spaced forward of the at least one first rear trailer wheel 208 intermediate front 144 and the at least one first rear trailer wheel 208, to support the trailer apparatus 100 for rolling movement across the ground 106. Referring to FIG. 2, it will be understood that the first forward axle 228 having at least one first forward trailer wheel 224 mounted thereon is located clear of the carrying bay 174 and is spaced outwardly from the same on the first side 160. In the specific embodiment illustrated in FIG. 1, trailer apparatus 100 on first half 156 includes two adjacent pairs of first forward trailer wheels 224 each mounted on a respective one of a pair of adjacent, parallel first rear axles 228 at the first lower portion 200 to support the trailer apparatus 100 for rolling movement across the ground 106. In other words, in the specific embodiment illustrated in FIG. 1, trailer apparatus 100 includes a total of four first forward trailer wheels 224 mounted in pairs near the front 144 on respective of two spaced first forward axles 228 at the first lower portion 200 of the first side portion 194.

Referring again to FIG. 2, in the specific embodiment illustrated, trailer apparatus 100 on second half 158 includes at least one second forward trailer wheel 232 mounted on a respective second forward axle 236 at the second lower portion 204, and which is spaced forward of the at least one second rear trailer wheel 216, and thus is intermediate front 144 and the at least one second rear trailer wheel 216, to support the trailer apparatus 100 for rolling movement across the ground 106. Referring to FIG. 2, it will be understood that the second forward axle 236 having at least one second forward trailer wheel 232 mounted thereon is located clear of the carrying bay 174 and is spaced outwardly from the same on the second side 162. In the specific embodiment illustrated in FIG. 2, trailer apparatus 100 on second half 158 includes two adjacent pairs of second forward trailer wheels 232 each mounted on a respective one of a pair of adjacent, parallel second forward axles 236 at the second lower portion 204 to support the trailer apparatus 100 for rolling movement across the ground 106. In other words, in the specific embodiment illustrated in FIG. 2, trailer apparatus 100 includes a total of four second forward trailer wheels 232 mounted in pairs near the front 144 on respective of two spaced second forward axles 236 at the second lower portion 204 of the second side portion 196.

Figure 5:
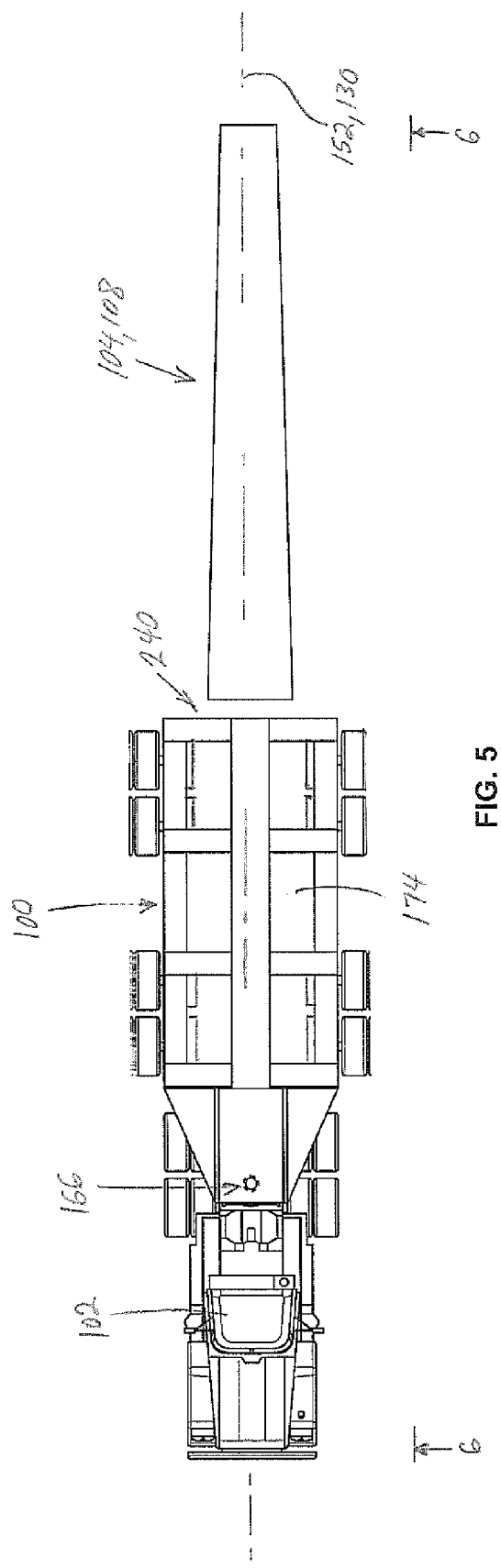
FIG. 5 is a schematic top view of trailer apparatus according to an embodiment aligned to be backed over a utility pole resting in a ground storage position.
Figure 8:
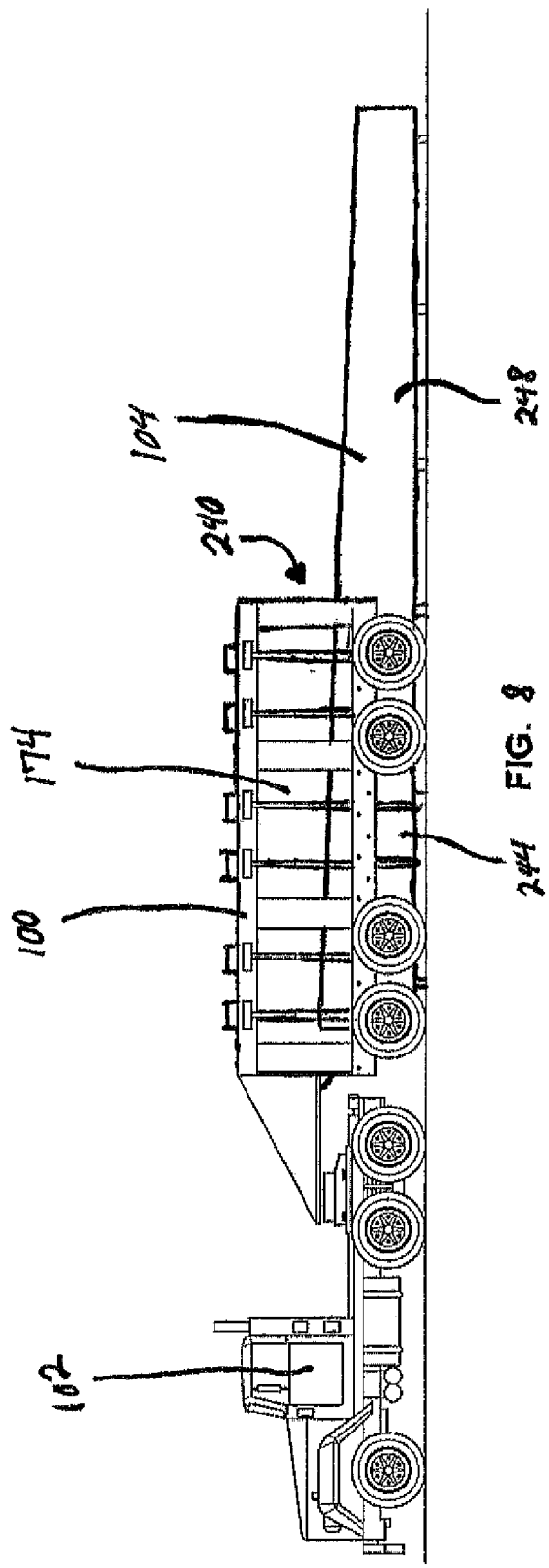
FIG. 8 is a schematic side view of trailer apparatus according to an embodiment and taken along 8-8 in FIG. 7, with the trailer apparatus positioned over a utility pole resting in a ground storage position with a segment of the utility pole aligned below the carrier bay.
Figure 9:
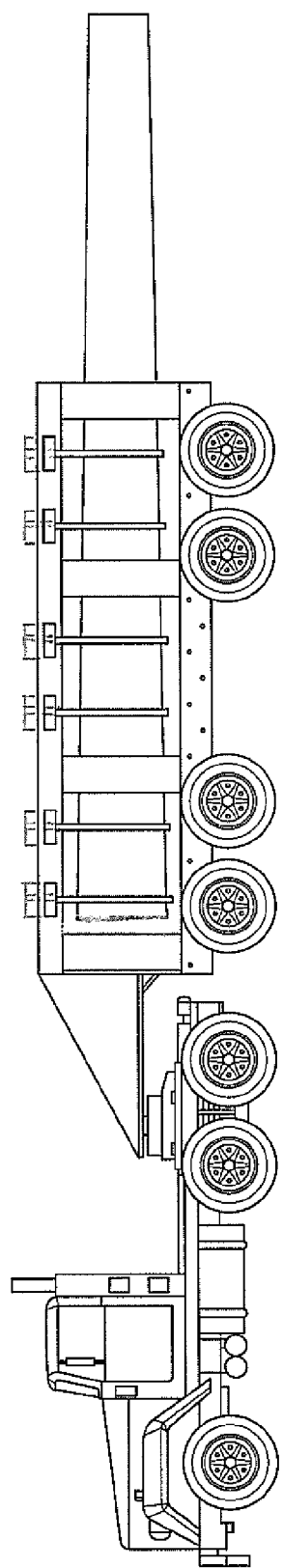
FIG. 9 is a schematic side view of trailer apparatus according to an embodiment as generally shown in FIG. 8, with trailer apparatus having loaded thereon a utility pole lifted to occupy the transport position with a segment of the utility pole supported in the carrier bay.

Referring again to FIG. 1, in the specific embodiment illustrated, the major frame assembly 140 at the rear 146 spans above the carrying bay 174 to provide a rear opening 240 of the carrying bay 174. As best shown in FIG. 3, rear opening 240 permits clear access from outside the rear 146 into the carrying bay 174 in the direction of the trailer frame longitudinal plane 152. Rear opening 240 extends perpendicular to trailer frame longitudinal plane 152 at rear 146. Rear opening 240 has a respective clear span width sufficient for the major frame assembly 140 to clear the utility pole 104 at rest in the ground storage position 108 (shown in FIG. 6) and when lifted to transport position 109 (Shown in FIG. 3). Rear opening 240 has a respective clear span height sufficient for the major frame assembly 140 to clear the utility pole 104 at rest on the ground 106 in a ground storage position 108 (FIG. 6) with the pole central axis 130 extending in a substantially horizontal direction. As shown in FIG. 5 and FIG. 8, rear opening 240 is proportioned and located such that when the trailer apparatus 100 moves backward in a longitudinal direction over the utility pole 104 occupying the ground storage position 108 with the trailer frame longitudinal plane 152 aligned substantially coextensive with the pole central axis 130, the rear opening 240 passes around the utility pole 104 as the trailer apparatus 100 moves backward for positioning the carrying bay 174 in alignment with a corresponding lengthwise segment 244 (see FIG. 8) of the utility pole 104. Rear opening 240 has a respective clear span height sufficient for an adjoining second lengthwise segment 248 of the utility pole 104 in the transport position 109 to protrude out of the carrying bay 174 through the rear opening 240.

Referring again to FIG. 1, in the specific embodiment illustrated, trailer apparatus 100 includes lifting apparatus 260. Lifting apparatus 260 is supported by the major frame assembly 140 and is selectively operable for lifting utility pole 104 from the ground storage position 108 to the transport position 109, and for lowering utility pole 104 from transport position 109 to ground storage position 108. Lifting apparatus 260 includes lifting engagement apparatus 120. Lifting engagement apparatus 120 is positionable in carrying bay 174 for engaging utility pole 104 in lifting relationship. Lifting engagement apparatus 120 is configurable to engage the utility pole 104 in lifting relationship therewith. Lifting engagement apparatus 120 can include any apparatus configurable to engage utility pole 104 in lifting relationship. In the specific embodiment shown in FIG. 1, lifting engagement apparatus 120 includes a flexible hoist cable 122 joined in combination with flexible hoist rigging (not shown) for engagement in secure, lifting relationship with utility pole 104. More particularly, in the specific embodiment illustrated in FIG. 1, hoist cable 122 at a terminal end thereof is securely joined with hoist rigging including a wire rope wrapped around the circumference of utility pole 104 for direct contact and engagement with outer surface 118. Wire rope at opposite ends thereof is joined to hoist cable 122 by a suitable shackle (not shown). Thus, in the specific embodiment illustrated in FIG. 1, lifting engagement apparatus 120 includes hoist cable 122 in joined combination with hoist rigging and configured for engagement in secure, lifting relationship with outer surface 118 of utility pole 104. Lifting apparatus 260 includes lifting machine equipment 272 supported by major frame assembly 140. Lifting machine equipment 272 can include any lifting equipment suitable for operation to perform lifting work adequate to lift utility pole 104 from ground storage position 108 to transport position 109. In the specific embodiment illustrated in FIG. 1, lifting machine equipment 272 includes hoist unit 276. In the specific embodiment illustrated in FIG. 1, hoist unit 276 includes a hoist reel (not shown) having hoist cable 122 spooled around the same. Hoist unit 276 includes a hoist motor 277 supported for driving engagement with the hoist reel (not shown) via suitable trained drive gears 278 intermediate hoist motor 277 and hoist reel. One of ordinary skill will understand that suitable hoist unit 276 can be purchased from multiple manufacturers of heavy-duty hoist equipment. One of ordinary skill will understand that hoist unit 276 has lifting capacity sufficient to lift a respective portion of utility pole 104. Hoist motor 277 of hoist unit 276 is selectively operable for rotating hoist reel in a take-up or lifting direction to cause hoist cable 122 to spool onto hoist reel to lift hoist rigging joined thereto in lifting engagement with utility pole 104 to cause the same to be lifted from the ground storage position 108 (see FIG. 8) to the transport position 109 (FIG. 1). The hoist motor 277 of hoist unit 276 is selectively operable for rotating hoist reel of the same in a let-out or lowering direction to cause hoist cable 122 to spool off from hoist reel to lower hoist rigging joined thereto in lifting engagement with utility pole 104 to cause the same to be lowered from the transport position 109 to ground storage position 108 (see FIG. 8). One of ordinary skill will understand that, in the specific embodiment illustrated in FIG. 1, lifting apparatus 260 includes a plurality of hoist units 276 disposed above lifting bay 174 and supported by upper portion 188 of major frame assembly 140. The plurality of hoist units 276 are spaced generally along trailer frame longitudinal plane 152 between front 144 and rear 146. It will be understood that the combined lifting capacity of the plurality of spaced hoist units 276 is sufficient at least to lift the mass of the lengthwise segment 244 of utility pole 104 received in carrying bay 174. It will be understood that, in the specific embodiment illustrated in FIG. 1, the combined lifting capacity of the plurality of spaced hoist units 276 is sufficient to lift the total mass of the utility pole 104, including both the first lengthwise segment 244 fitting in carrying bay 174 and the adjoining second lengthwise segment 248 extending out from the rear opening 240. Lifting apparatus 260 including the plurality of spaced hoist units 276 thus is selectively operable for lifting utility pole 104 from the ground storage position 108 (shown in FIG. 8) to transport position 109. In the specific embodiment illustrated in FIG. 1, the lifting apparatus 260 is selectively operable for lifting utility pole 104 from the ground storage position 108 to the transport position 109, and the lifting apparatus 260 is selectively operable for lowering the utility pole 104 from the transport position 109 to the ground storage position 108. Thus, according to embodiments, lifting apparatus 260 includes at least one hoist unit 276 supporting a hoist cable 122 in combination therewith, the at least one hoist cable 122 cooperating with suitable adjustable hoist rigging to engage the utility pole 104 in a lifting relationship, and the at least one hoist unit 276 being selectively operable to raise the at least one hoist cable 122 having hoist rigging joined therewith to cause the same to lift the utility pole 104 from the ground storage position 108 (FIG. 6) to the transport position 109 (FIG. 1).

Figure 10:
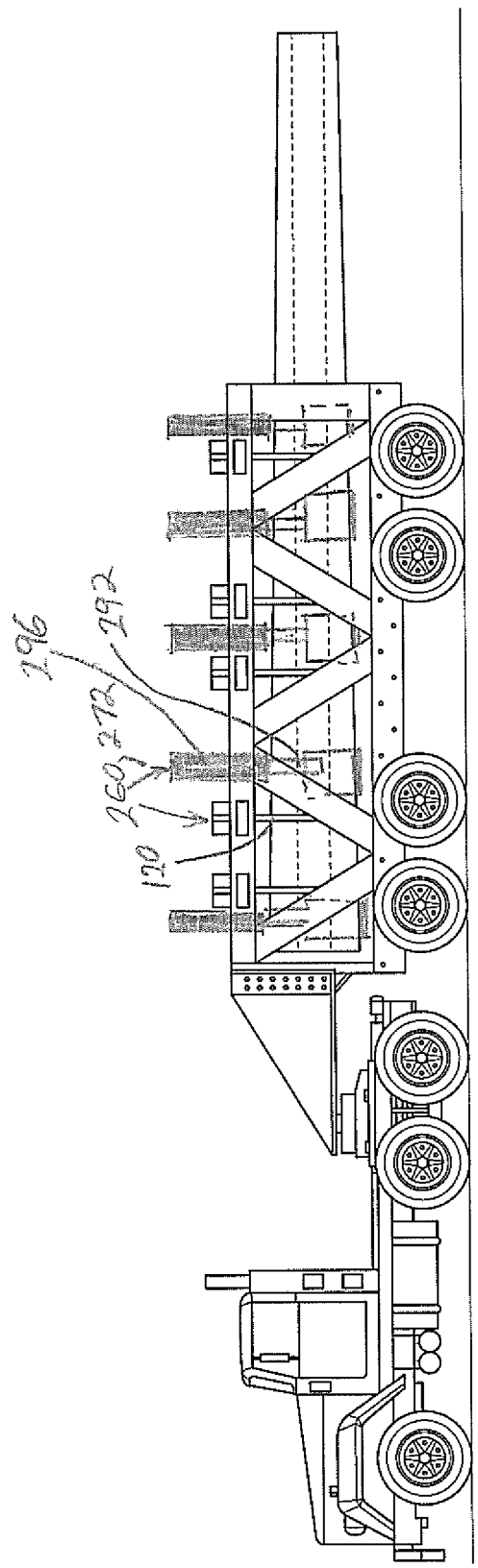
FIG. 10 is a flow diagram illustrating a method for transporting a utility pole according to an embodiment.

It will be understood that, according to embodiments, lifting apparatus 260 can include any suitable lifting engagement apparatus 120 and lifting machine equipment 272. For example, according to a further embodiment shown in FIG. 10, lifting apparatus 260 can include lifting engagement apparatus 120 having a set of spaced, movable lifting arms 292 arranged in opposed relation along opposite first and second sides 160,162 for engaging opposite sides of utility pole 104. According to the further embodiment shown in FIG. 13, lifting apparatus 260 can include lifting machine equipment 272 having a set of pressurized hydraulic cylinders 296 selectively operable to cause lifting arms 292 to move into lifting engagement with utility pole 104 in ground storage position 108 and to move upwardly and thus lift utility pole 104 engaged by the same from ground storage position 108 to transport position 109, and the set of pressurized hydraulic cylinders 296 being selectively operable to cause lifting arms 292 to move downwardly and thus to lower utility pole 104 engaged by the same from transport position 109 to ground storage position 108 and to move and release the same at the ground storage position 108.

Figure 4:
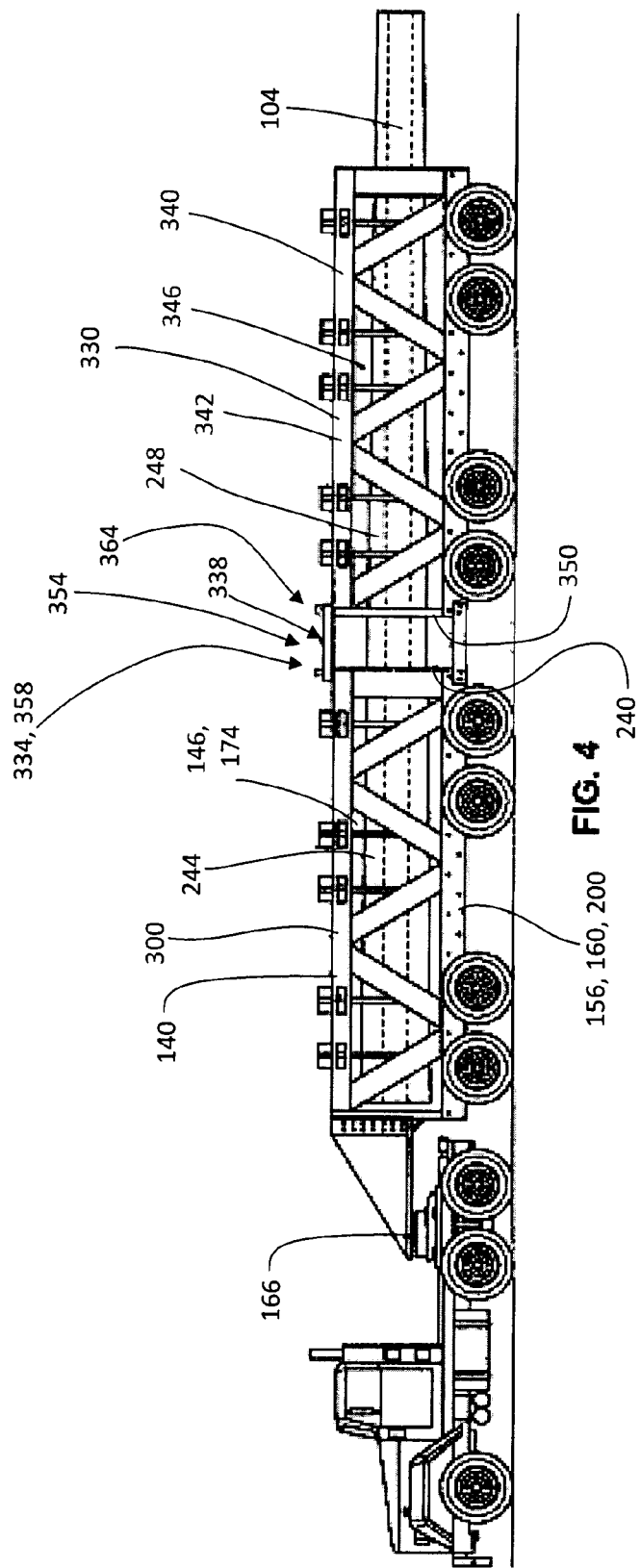
FIG. 4 is a side elevation view of trailer apparatus and slave unit trailer apparatus trained in series according to an embodiment and carrying a utility pole.

FIG. 4 shows trailer apparatus 330 according to an alternate embodiment and in combination with a truck 102 and loaded with a utility pole 104. Trailer apparatus 330 is substantially identical to trailer apparatus 100, except as otherwise described in this paragraph or shown in FIG. 10. Trailer apparatus 300 includes near rear 146 a rear training connector 334. One of ordinary skill will appreciate that rear training connector 334 is compatible with a forward training connector 338 of a second, slave unit trailer apparatus 342 for training the slave unit trailer apparatus 342 with preceding trailer apparatus 330. Utility pole 104 has a first lengthwise segment 244 received in carrying bay 174 of preceding trailer apparatus 330 and a second lengthwise segment 248 projecting or extending out the rear opening 240 of the preceding trailer apparatus 330. Slave unit trailer apparatus 342 has a respective slave unit carrying bay 346 for receiving therein a portion of the projecting second lengthwise segment 248 of utility pole 104. Slave unit trailer apparatus 342 at front 144 includes a front opening 350. Front opening 350 is substantially identical to rear opening 240 of trailer apparatus 100, as previously described and shown in FIG. 3. Returning to FIG. 4, front opening 350 is configured to enable second lengthwise segment 248 to extend into slave unit carrying bay 346. Slave unit trailer apparatus 342 includes forward training connector 338 joined to the slave unit major frame assembly 340 proximate the front 364 thereof. Forward training connector 338 is configured for coupling with the compatible rear training connector 334 of preceding trailer apparatus 100 to enable the slave unit trailer apparatus 342 to be drawn behind the preceding trailer apparatus 100. According to a specific embodiment shown in FIG. 4, forward training connector 338 and compatible rear training connector 334 include a set of rigid plates 354 extending between major frame assemblies 140, 340 of trailer apparatus 100 and slave unit trailer apparatus 342 and having therein a set of spaced bolt holes (not shown) for alignment with other bolt holes (not shown) located on the respective major frame assemblies 140,340 of trailer apparatus 100 and slave unit trailer apparatus 342, the rigid plates 354 being secured to the respective major frame assemblies 140,340 via a plurality of heavy bolt and nut fastener assemblies 358 and thus securing the preceding trailer apparatus 300 and slave unit trailer apparatus 330 in substantially fixed, linear relationship. One of ordinary skill will understand that use of rigid plates 354 to connect preceding trailer apparatus 300 and slave unit trailer apparatus 330 enables slave unit trailer apparatus 330 to be maneuvered in common with the preceding trailer apparatus 300 for loading and unloading, such as by being backed in a common direction. It will be understood that preceding trailer apparatus 300 is substantially identical to trailer apparatus 100 described elsewhere herein.

Figure 11:
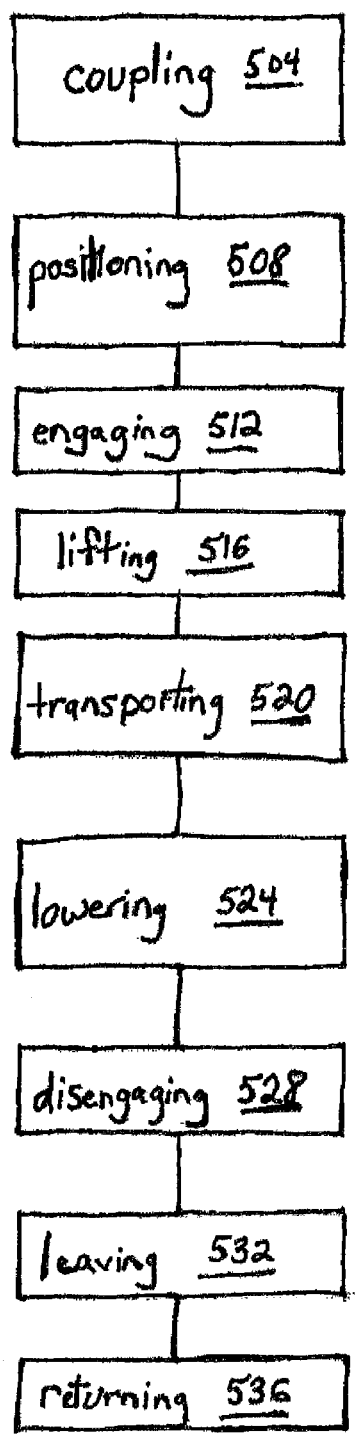
FIG. 11 is a flow diagram illustrating a method for transporting a utility pole according to an alternate embodiment.

Illustrated in FIG. 11 is an embodiment of a method 500 for transporting a utility pole from a first location to a second location, where the second location is remote from the first location. One of ordinary skill will understand that, at the first location the utility pole initially rests on the ground in a substantially horizontal ground storage position, as previously described. Method 500 includes a plurality of steps, as follows. Coupling 504 empty trailer apparatus to a truck for loading the utility pole at the first location. The empty trailer apparatus has a construction as described above for trailer apparatus 100. Positioning 508 the empty trailer apparatus over the utility pole in the ground storage position at the first location by operating the truck to back the trailer apparatus over the utility pole such, that the major frame assembly passes over the utility pole at the rear opening until a segment of the utility pole is aligned below the carrying bay. Engaging 512 the lifting apparatus in a lifting relationship with the utility pole in the ground storage position at the first location. Lifting 516 at least the aligned segment of the utility pole from the ground storage position to a transport position in the carrying bay by operating the lifting apparatus. Transporting 520 from the first location to the second location the loaded trailer apparatus having thereon the utility pole supported in the transport position. Lowering 524 the utility pole from the transport position to a ground storage position at the second location by operating the lifting apparatus. After lowering 524 occurs the step of disengaging 528 the lifting apparatus from the lifting relationship with the utility pole in the ground storage position at the second locations. After disengaging 528, the step of leaving 532 the utility pole in the ground storage position at the second location by operating the truck to pull the empty trailer apparatus forward over the utility pole and away from the same.

One of ordinary skill will understand that, after the step of leaving 532, an optional step can be performed: returning 536 the empty trailer apparatus from the second location back to the first location by operating the truck to pull the empty trailer apparatus.

Figure 12:
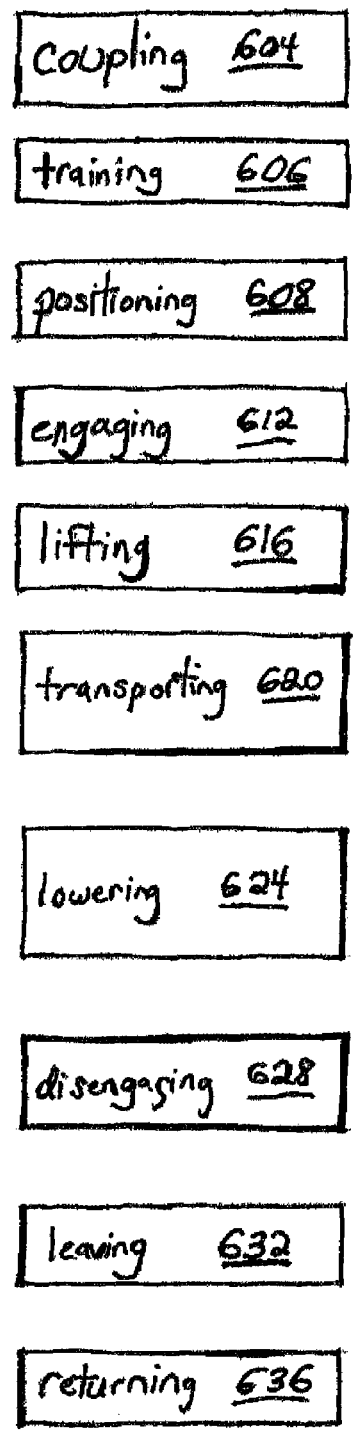
FIG. 12 is a flow diagram illustrating a method which utilizes slave unit trailer apparatus according to an embodiment.

Illustrated in FIG. 12 is a method 600 which utilizes slave unit trailer apparatus, and is otherwise similar to preceding method 500 shown in FIG. 11 and described in the preceding paragraph. One of ordinary skill will understand that according to method 600, suitable slave unit trailer apparatus can be substantially identical to previously described slave unit trailer apparatus 342. Method 600 is substantially identical to method 500, except as described in this paragraph or illustrated in FIG. 12. The step of coupling 604 is identical to the step of coupling 504 in preceding method 500. The step of positioning 608 is substantially identical to the step of positioning 508 of preceding method 500. Following the step of coupling 604, and before the step of positioning 608, method 600 includes the additional step of training 606 training slave unit trailer apparatus behind preceding trailer apparatus, such that the slave unit trailer apparatus in a slave unit carrying bay thereof receives a second lengthwise segment of the utility pole that extends out the rear opening of the preceding trailer apparatus. It will be understood that the preceding trailer apparatus can have the construction specified in claim 1, or another suitable construction described in this disclosure. One of ordinary skill will understand that, in performing method 600, the steps subsequent to training 606 are performed for both the preceding trailer apparatus and the trained slave unit trailer apparatus. The steps of method 600 subsequent to training 606 are otherwise substantially identical to the steps of method 500.

Embodiments provide improved trailer apparatus for transporting utility poles from location to location. Embodiments provide improved methods for transporting utility poles from location to location. Embodiments provide improved trailer apparatus and methods which can be performed at a location for loading a utility pole and at a location for unloading a utility pole solely by operating a truck and trailer combination, without requiring separate lifting equipment units such as cranes. Embodiments provide improved trailer apparatus and methods which include, utilize integrate, and enable the following, without use of separate lifting equipment units such as cranes: loading of a utility pole at a loading location, transport of the subject utility pole from a loading location to an unloading location, and unloading of the subject utility pole at the unloading location.

Although specific embodiments are illustrated and described herein, it will be appreciated by those of ordinary skill in the art that any arrangement which is calculated to achieve the same purpose can be substituted for the specific embodiments shown. This application is intended to cover any adaptations or variations. For example, although described in terms of the specific embodiments, one of ordinary skill in the art will appreciate that implementations can be made in different embodiments to provide the required function. In particular, one of skill in the art will appreciate that the names and terminology of the apparatus are not intended to limit embodiments. Furthermore, additional apparatus and method steps can be added to the components, functions can be rearranged among the components and method steps, and new components to correspond to future enhancements and physical devices used in embodiments can be introduced without departing from the scope of embodiments. The terminology used in this application is intended to include all environments and alternatives which provide the same functionality as described herein.

What is claimed is:

1. A trailer apparatus for transporting an elongated utility pole from a loading location to an unloading location, the utility pole having a substantially rigid continuous outer surface extending from a first end to a second end thereof in substantially parallel spaced relation to a pole central axis, the trailer apparatus comprising:

a major frame assembly having a front, the major frame assembly having a rear disposed in opposed relation to the front, the rear being spaced from the front in a rearward direction relative to a trailer frame longitudinal axis, the major frame assembly extending from the front to the rear relative to the trailer frame longitudinal axis, the trailer frame longitudinal axis defining longitudinal extent of a trailer frame longitudinal plane, the trailer frame longitudinal plane extending in a vertical direction, the trailer frame longitudinal plane substantially bisecting the major frame assembly intermediate oppositely disposed lateral halves thereof, the lateral halves including a first half defined on a first side of the trailer frame longitudinal plane in lateral relation thereto, the halves including a second half defined on a second side of the trailer frame longitudinal plane in lateral relation thereto;

a forward trailer hitch component joined to the major frame assembly proximate the front, the forward trailer hitch component being configured for coupling with a compatible drawing hitch component of a truck to enable the trailer apparatus to be drawn by the truck;

the major frame assembly defining an elongated carrying bay, the carrying bay having a carrying bay longitudinal plane extending substantially parallel to the trailer frame longitudinal plane, the carrying bay having a clear span width perpendicular to the carrying bay longitudinal plane, the clear span width being sufficient to permit the utility pole to be received in the carrying bay in a transport position, in the transport position the pole central axis extending in a substantially horizontal orientation, the carrying bay having a clear span height in the vertical direction, the clear span height being sufficient to permit the utility pole to be received in the carrying bay in the transport position with clearance between the utility pole and the ground adequate to permit transport of the utility pole on the trailer apparatus;

the major frame assembly having an upper portion, the upper portion spanning above the carrying bay from the first half to the second half to provide the clear span height thereunder;

the major frame assembly in the first half having a first side portion, the first side portion extending downwardly from the upper portion, the first side portion terminating below the upper portion in spaced relation thereto at a respective first lower portion, the major frame assembly in the second half having a second side portion, the second side portion extending downwardly from the upper portion, the second side portion terminating below the upper portion in spaced relation thereto at a respective second lower portion, the upper portion spanning from the first side portion to the second side portion to join the same in fixed relation, the first side portion being spaced from the second side portion with the carrying bay disposed there between to provide the clear span width there between, the first side portion extending upward from the first lower portion to the upper portion to support the upper portion in the first half at the clear span height, the second side portion extending upward from the second lower portion to the upper portion to support the upper portion in the second half at the clear span height; at least one first rear trailer wheel mounted on a first rear axle at the first lower portion to support the trailer apparatus for rolling movement across the ground, the first rear axle being clear of the carrying bay;

at least one second rear trailer wheel mounted on a second rear axle at the second lower portion to support the trailer apparatus for rolling movement across the ground, the second rear axle being clear of the carrying bay;

the major frame assembly at the rear spanning above the carrying bay to provide a rear opening of the carrying bay, the rear opening permitting clear access from outside the rear to the carrying bay in the direction of the trailer frame longitudinal plane, the rear opening having a respective clear span height sufficient for the major frame assembly to clear the utility pole at rest on the ground in a ground storage position, in the ground storage position the pole longitudinal axis extending in a substantially horizontal direction, such that when the trailer is backed in the longitudinal direction over the utility pole occupying the ground storage position with the trailer frame longitudinal plane substantially coextensive with the pole central axis the rear opening passes around the utility pole as the trailer moves backward for positioning the carrying bay in alignment with a corresponding lengthwise segment of the utility pole, the rear opening having a respective clear span height sufficient for an adjoining second lengthwise segment of the utility pole in the transport position to protrude out of the carrying bay through the rear opening; and a lifting apparatus supported by the major frame assembly, the lifting apparatus including pole engaging apparatus positionable in the carrying bay, the pole engaging apparatus being configurable to engage the utility pole in lifting relationship therewith, the lifting apparatus being selectively operable for lifting at least the lengthwise segment of the utility pole fitting in the carrying bay from the ground storage position to the transport position, the lifting apparatus being selectively operable for lowering the utility pole from the transport position to the ground storage position, wherein the lifting apparatus includes at least one hoist and hoist cable combination, the at least one hoist cable cooperating with suitable adjustable rigging to engage the utility pole in a lifting relationship, the at least one hoist being selectively operable to raise the at least one hoist cable to cause the same to lift the utility pole, the at least one hoist including a hoist motor for driving the hoist cable between trained drive gears, the trained drive gears being between the hoist motor and the hoist cable.

2. Trailer apparatus according to claim 1 and further comprising:

at the front the major frame assembly spanning above the carrying bay to provide a forward opening to the carrying bay, the forward opening providing clearance sufficient for the trailer to clear the utility pole at rest in a ground storage position when the trailer is moved forward in the longitudinal direction over the utility pole with the trailer frame longitudinal plane substantially coextensive with the pole longitudinal axis for positioning the carrying bay in alignment with the utility pole.

3. Trailer apparatus according to claim 1 and further comprising:

at least one first forward trailer wheel mounted on a first forward axle at the first lower portion to support the trailer apparatus for rolling movement across the ground, the first forward axle being clear of the carrying bay, the first forward axle being spaced forward of the first rear axle in parallel relation thereto;

at least one second forward trailer wheel mounted on a respective second forward axle at the second lower portion to support the trailer apparatus for rolling movement across the ground, the second forward axle being clear of the carrying bay, the second forward axle being spaced forward of the second rear axle in parallel relation thereto.

4. Trailer apparatus according to claim 3 and further comprising:

at least one slave unit first forward trailer wheel substantially identical to the first forward trailer wheel of the trailer apparatus; and at least one slave unit second forward trailer wheel substantially identical to the second forward trailer wheel of the trailer apparatus.

5. Trailer apparatus according to claim 1 and further comprising:

primary support apparatus mounted on the major frame assembly, the primary support apparatus being selectively positionable relative to the utility pole in the carrying bay to provide primary support for the utility pole during transport of the same.

6. Trailer apparatus according to claim 5 and further comprising:

the primary support apparatus including a movable support element mounted on the major frame assembly for selective movement relative thereto to a supporting position, the movable support element in the supporting position engaging the utility pole in the carrying bay to provide primary support forces against the utility pole during transport of the same.

7. Trailer apparatus according to claim 1 and further comprising:

a rear training connector compatible with a forward training connector of a slave unit trailer apparatus for training the slave unit trailer apparatus with the trailer apparatus according to claim 1;

where the utility pole has a projecting section extending out the rear of the trailer apparatus according to claim 1, the slave unit trailer apparatus having a slave unit carrying bay for receiving therein a portion of the projecting section of the utility pole; the slave unit trailer apparatus comprising:

a slave unit major frame assembly, the slave unit major frame assembly being substantially identical to the major frame assembly of the trailer apparatus according to claim 1;

the forward training connector of the slave unit trailer apparatus joined to the slave unit major frame assembly proximate the front of the same, the forward training component being configured for coupling with the compatible rear training connector of the trailer apparatus preceding the slave unit trailer apparatus to enable the slave unit trailer apparatus to be drawn with the same;

the slave unit carrying bay being substantially identical to the carrying bay of the trailer apparatus according to claim 1; at least one slave unit first rear trailer wheel substantially identical to the first rear trailer wheel of the trailer apparatus according to claim 1;

at least one slave unit second rear trailer wheel substantially identical to the second rear trailer wheel of the trailer apparatus according to claim 1; and a slave unit lifting apparatus mounted on the slave unit major frame assembly, the slave unit lifting apparatus being substantially identical to the lifting apparatus of the trailer apparatus according to claim 1.

8. Trailer apparatus according to claim 7 and further comprising:

wherein the slave unit trailer apparatus is trained in substantially fixed linear relationship with the preceding trailer apparatus according to claim 1 to enable the slave unit trailer apparatus to be backed in a common direction with the preceding trailer apparatus according to claim 1.

9. A trailer apparatus for transporting an elongated utility pole from a loading location to an unloading location, the utility pole having a substantially rigid continuous outer surface extending from a first end to a second end thereof in substantially parallel spaced relation to a pole central axis, the trailer apparatus comprising:

a major frame assembly having a front, the major frame assembly having a rear disposed in opposed relation to the front, the rear being spaced from the front in a rearward direction relative to a trailer frame longitudinal axis, the major frame assembly extending from the front to the rear;

a forward trailer hitch component joined to the major frame assembly proximate the front, the forward trailer hitch component being configured for coupling with a compatible drawing hitch component of a truck to enable the trailer apparatus to be drawn by the truck;

the major frame assembly defining an elongated carrying bay;

the major frame assembly having an upper portion;

the major frame assembly at the rear spanning above a carrying bay to provide a rear opening of the carrying bay, the rear opening permitting clear access from outside the rear to the carrying bay, the rear opening having a respective clear span height sufficient for the major frame assembly to clear the utility pole at rest on the ground in a ground storage position; and a lifting apparatus supported by the major frame assembly, the lifting apparatus including pole engaging apparatus positionable in the carrying bay, the pole engaging apparatus being configurable to engage the utility pole in lifting relationship therewith, the lifting apparatus being selectively operable for lifting the utility pole fitting in the carrying bay from the ground storage position to a transport position, the lifting apparatus being selectively operable for lowering the utility pole from the transport position to the ground storage position, the lifting apparatus including at least one hoist and hoist cable combination, the at least one hoist cable cooperating with suitable adjustable rigging to engage the utility pole in a lifting relationship, the at least one hoist being selectively operable to raise the at least one hoist cable to cause the same to lift the utility pole, the at least one hoist including a hoist motor for driving the hoist cable between trained drive gears, the trained drive gears being between the hoist motor and the hoist cable.

10. The trailer apparatus according to claim 9 and further comprising:

primary support apparatus mounted on the major frame assembly, the primary support apparatus being selectively positionable relative to the utility pole in the carrying bay to provide primary support for the utility pole during transport of the same.

11. The trailer apparatus according to claim 10 and further comprising:

the primary support apparatus including a movable support element mounted on the major frame assembly for selective movement relative thereto to a supporting position, the movable support element in the supporting position engaging the utility pole in the carrying bay to provide primary support forces against the utility pole during transport of the same.

* * * * *